(12) United States Patent
Olczak

(10) Patent No.: US 6,385,147 B1
(45) Date of Patent: May 7, 2002

(54) RECORDING AND SIMULTANEOUSLY READING INFORMATION RECORDED ON A MOVEABLE OPTICAL RECORDING MEDIUM BY ADJUSTING THE RELATIVE POSITION OF FIRST AND SECOND BEAM PATHS

(75) Inventor: Eugene G. Olczak, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/478,120

(22) Filed: Jan. 4, 2000

(51) Int. Cl.$^7$ .................................................. G11B 7/00
(52) U.S. Cl. .......................... 369/44.38; 369/112.29; 369/124.02; 369/53.31
(58) Field of Search .................... 369/44.37, 44.38, 369/97, 120, 112.29, 124.02, 53.31

(56) References Cited

U.S. PATENT DOCUMENTS

| | | | |
|---|---|---|---|
| 5,105,403 A | * | 4/1992 | Knado et al. ............. 369/44.12 |
| 5,191,204 A | * | 3/1993 | Dickson et al. .......... 250/208.2 |
| 5,216,562 A | * | 6/1993 | Luecke et al. .............. 360/114 |
| 5,948,288 A | * | 9/1999 | Treves et al. .......... 219/121.68 |
| 6,058,092 A | * | 5/2000 | Masters et al. ................ 369/97 |

OTHER PUBLICATIONS

"Optical Recording: a Technical Overview" by Alan B. Marchant, Addison–Wesley Publishing, 1990, p304.

\* cited by examiner

*Primary Examiner*—David Hudspeth
*Assistant Examiner*—Gautam R. Patel
(74) *Attorney, Agent, or Firm*—Raymond L. Owens

(57) ABSTRACT

Apparatus for simultaneously recording and reading information on a medium moveable in forward and reverse directions includes a first record laser and means for establishing a first beam path for recording information on the moveable medium and a second read laser and at least one read-out detector and means for establishing a beam path so that the light from the second laser illuminates the medium and is reflected to the detector which reads recorded information. The apparatus further adjusts the relative position of the first and second laser beam paths so that, in a first position, when the medium is moving in the forward direction, the first and second laser paths are arranged in close proximity so that the detector reads information which was just previously recorded by the record laser and that, in the second position, when the medium is moving in the reverse direction, the first and second laser paths are arranged in close proximity so that the detector reads information which was just previously recorded by the record laser.

9 Claims, 3 Drawing Sheets

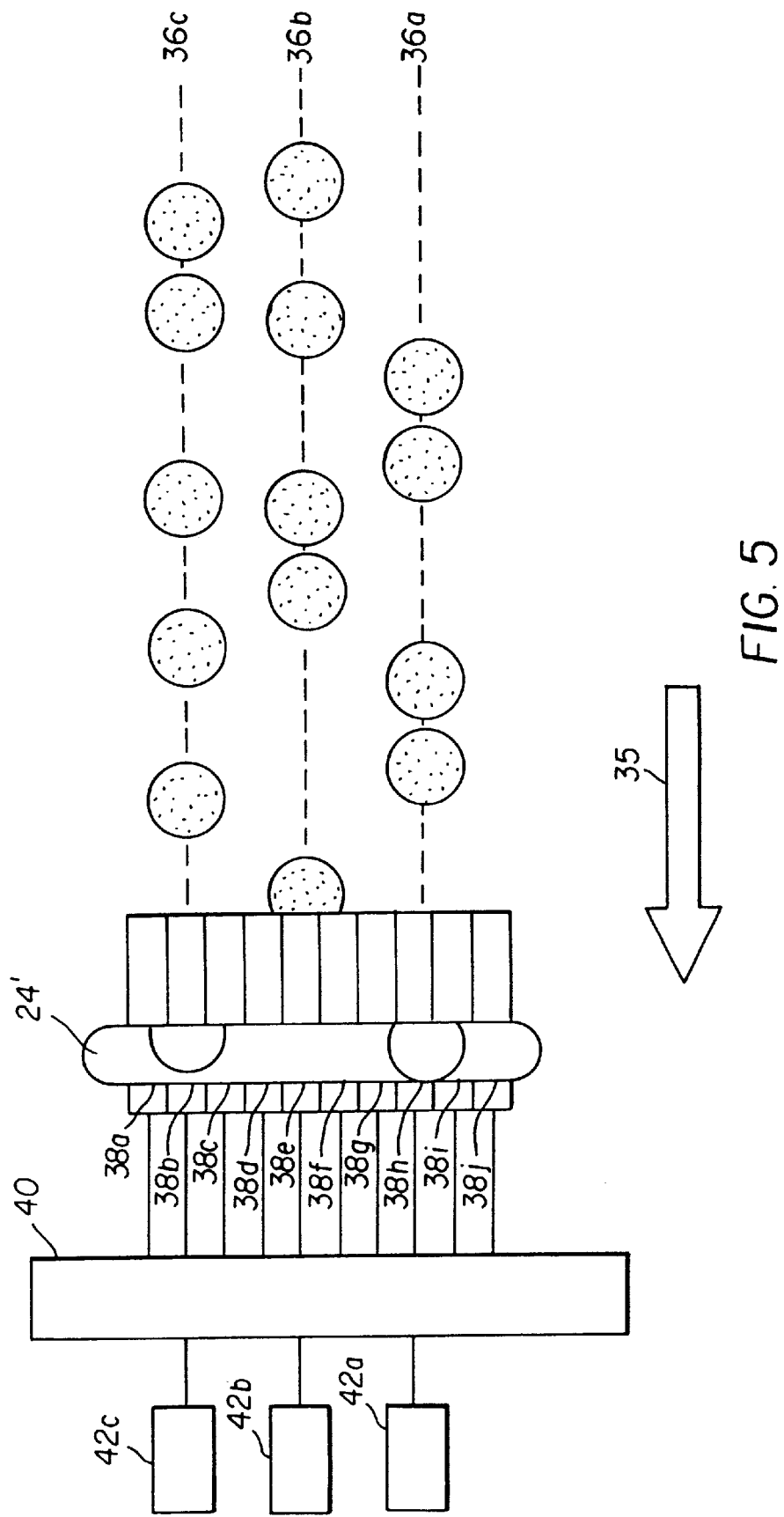

RECORDING AND SIMULTANEOUSLY READING INFORMATION RECORDED ON A MOVEABLE OPTICAL RECORDING MEDIUM BY ADJUSTING THE RELATIVE POSITION OF FIRST AND SECOND BEAM PATHS

FIELD OF THE INVENTION

The present invention relates to simultaneously reading and writing on an optical medium such as an optical tape.

BACKGROUND OF THE INVENTION

Direct Read After Write (DRAW) has been recognized as a design option for optical recording systems since the earliest introduction of the technology. (See Marchant, *Optical Recording: a Technical Overview*, Addison Wesley, 1990, p304.) As illustrated in FIG. 1, a prior art optical head 10 is schematically shown. A record laser 12 directs a beam of light through an objective lens 14 which is focused on a recording spot 16 on a moveable optical medium 18 that is moving in a direction 25 relative to the optical head. Also, a read laser 20 directs a beam of light through a beam splitter 22 and the objective lens 14 onto the surface of the moveable optical medium 18 to form a read spot 24. This beam of light is reflected back to the beam splitter 22 which directs the light beam to a detector 26 shown as a photodiode.

More particularly, the beam from the read laser 20 is unmodulated and is focused on the moveable medium 18 downstream from the recording spot. Reflection of the read laser beam from the medium is modulated by the presence of marks on the recording medium newly recorded by the record laser beam. The detector 26 reconstructs the recorded data for comparison with the data just processed for recording. This is why this process is called Direct Read After Write, or DRAW. DRAW provides nearly instantaneous verification of recorded data reliability, eliminating the latency encountered with conventional, second-pass verification.

In optical recording, there must be some level of verification that the recording medium will support error free recording and reproduction. When optical tape is the medium of choice, there is also a requirement that the recording system can record and read bi-directionally, that is, when the tape is either moving in a forward or reverse direction. A problem with optical tape recording systems is that existing DRAW heads do not have this functionality.

SUMMARY OF THE INVENTION

It is an object of the present invention to provide apparatus which provides DRAW functionality when the optical recording medium is moveable bi-directionally in either forward or reverse directions.

This object is achieved by an apparatus for simultaneously recording and reading information on a medium moveable in forward and reverse directions, comprising:

a) means including a first record laser and establishing a first beam path for recording information on the moveable medium;

b) means including a second read laser and at least one read-out detector and establishing a beam path over which light from the second laser illuminates the medium and is reflected to the detector which reads recorded information; and c) means for adjusting the relative position of the first and second laser beam paths so that, in a first position, when the medium is moving in the forward direction, the first and second laser paths are arranged in close proximity so that the detector reads information which was just previously recorded by the record laser and that, in the second position, when the medium is moving in the reverse direction, the first and second laser paths are arranged in close proximity so that the detector reads information which was just previously recorded by the record laser.

ADVANTAGES

The present invention has as an advantage that it permits the DRAW read beam to be focused at a position downstream from the recording beam, with respect to scanning of the medium during recording. In the prior art, if the media velocity is reversed, as in serpentine recording on optical tape, the DRAW beam is sometimes positioned on the upstream side of the recording beam, and therefore cannot detect the recorded pattern.

A feature of the present invention is that it provides verification without requiring prior art methods of pre-scanning for media defects or multiple-pass readout for data verification.

BRIEF DESCRIPTION OF THE DRAWINGS

FIG. 5 corresponds somewhat to FIG. 4 but shows the multichannel read beam as it is focused onto a detector array.

DETAILED DESCRIPTION OF THE INVENTION

Figure 1:
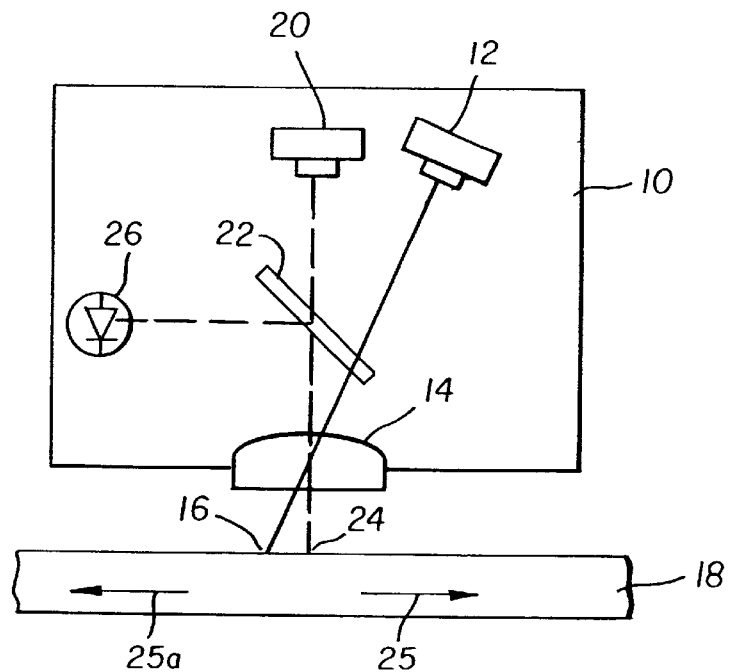
FIG. 1 is a schematic illustration of a prior art DRAW arrangement for reading and writing on an optical medium which is moveable in one direction.

Turning now to FIG. 1, an apparatus includes an optical head 10 that provides DRAW functionality that includes a record laser 12 that directs a beam of light through an objective lens 14 by which it is focused on a recording spot 16 on a moveable optical medium 18. The medium 18 can be a flexible optical tape. Alternatively, it can be an optical card. The read laser 20 establishes and directs a beam of light to establish a beam path through a beam splitter 22 and the objective lens 14 onto the surface of the moveable optical medium 18 to form a read spot 24. This beam of light is reflected back to the beam splitter 22 which directs the light beam to a detector 26 shown as a photodiode.

When the recording media motion relative to the optical head corresponds to direction 25, the read spot 24 is positioned downstream from the recording spot 16. Reflection of the read laser beam from the medium is modulated by the presence of marks on the recording medium newly recorded by the read laser beam and the detector 26 reconstructs the recorded data immediately after data recording.

Figure 2:
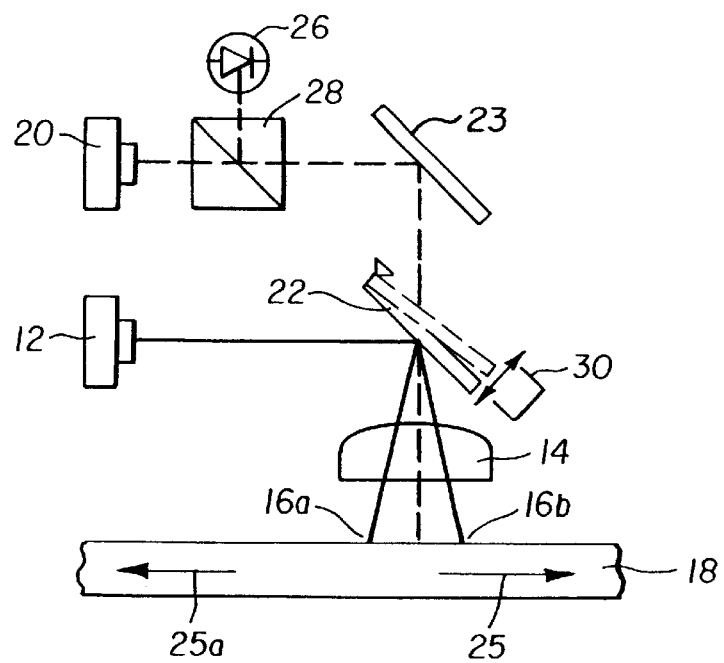
FIG. 2 is a schematic illustration of apparatus in accordance with a first embodiment of the present invention which uses DRAW and wherein the optical medium is moveable in forward and reverse directions.

FIG. 2 illustrates design of the optical head in accordance with the invention. Beam splitter 22 serves to combine the readout and recording beams for transmission through the objective lens 14. The readout beam path is folded by a mirror 23 which is optional. Another beam splitter 28 deflects the reflected portion of the readout beam to illuminate the detector 26. Tilt of the first beam splitter 22 is controlled by an actuator 30. The beam splitter 22 is positioned in a first tilt orientation when the media is moving in a forward direction 25 such that the recording spot 16a is oriented upstream from the read spot. When the media velocity is reversed to direction 25a, the actuator 30 changes the tilt of beam splitter 22 such that the recording spot shifts to 16b, again upstream from the read spot in relation to the moving medium. The actuator 30 adjusts the relative position of the laser beam paths so that, in a first position, when the medium 18 is moving in the forward direction 25, the first and second laser paths are arranged in close proximity so that the detector 26 reads information which was just previously recorded by the record laser 12. In the second position, when the medium 18 is moving in the reverse direction 25a, the first and second laser paths are arranged in close proximity so that the detector reads information which was just previously recorded by the record laser 12.

Figure 3:
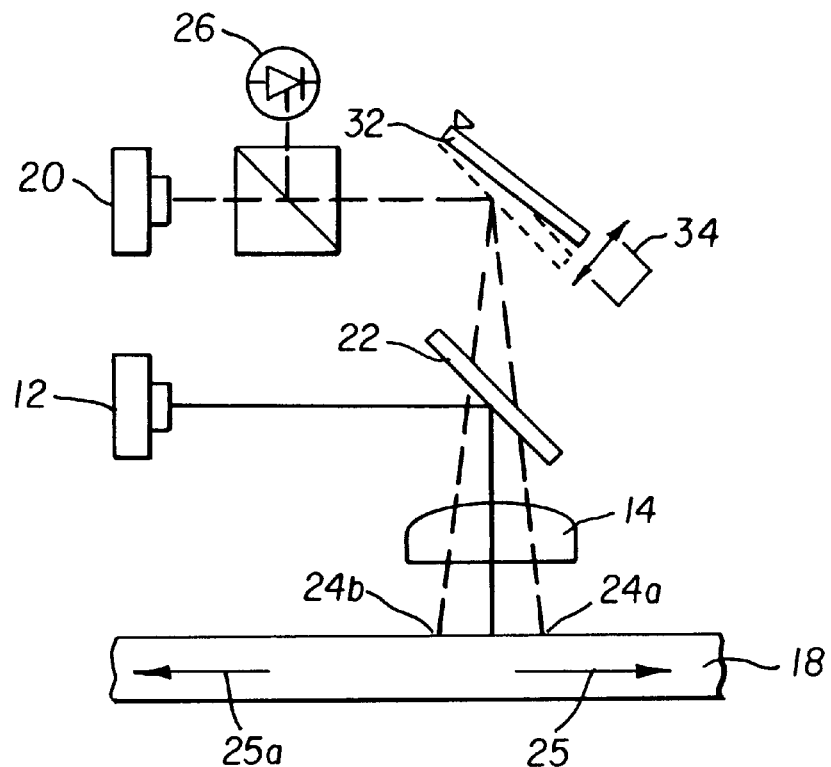
FIG. 3 is a schematic illustration of apparatus in accordance with a second embodiment of the present invention which uses DRAW and wherein the optical medium is moveable in forward and reverse directions.

FIG. 3 illustrates an optical head similar to the head in FIG. 2 with an alternative embodiment of the invention. In this head, the beam splitter 22 is fixed. A mirror 32 disposed in the optical path of the readout beam has adjustable tilt controlled by an actuator 34. The mirror 32 is positioned in a first tilt orientation when the media is moving in direction 25 such that the read spot 24a is oriented downstream from the record beam. When the media velocity is reversed to direction 25a, the actuator 34 changes the tilt of mirror 32 such that the read spot shifts to 24b, again downstream from the recording spot in relation to the moving medium.

Figure 4:
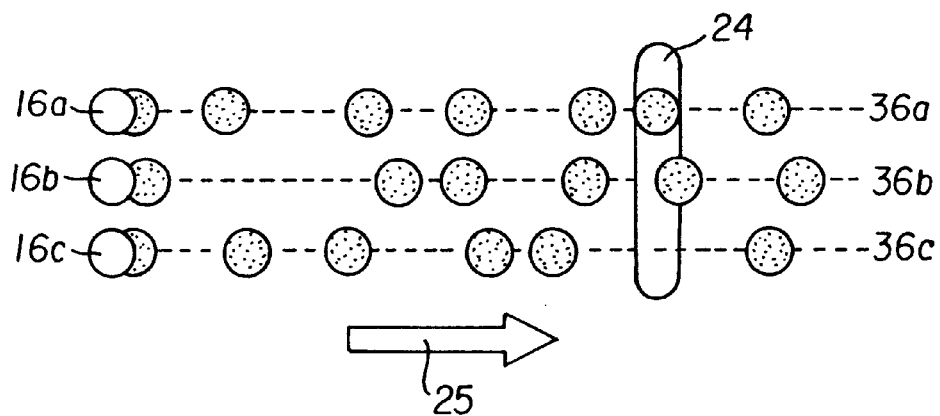
FIG. 4 shows a layout of multichannel record beams and the read beam showing the read beam to have a larger area than the record beam at the surface of the optical medium.

DRAW functionality requires precise alignment control and stability in the optical head to keep the focused readout beam precisely centered on the newly recorded data track. The alignment requirements may be especially severe for multi-channel optical recording. The required positional tolerance is much less than the spacing between data tracks. FIG. 4 illustrates how the alignment requirement can be met using a read beam focused to a line rather than a spot. Recording laser beams are focused to form independent recording spots 16a, 16b, and 16c on the medium. While the recording medium moves in the direction 25, the modulation of the recording laser beams creates tracks 36a, 36b, and 36c of recorded marks downstream from the recording spots. These newly recorded tracks are illuminated by a read spot 24, focused to a line that crosses all the tracks at a location downstream from the recording spots.

FIG. 5 illustrates how the optical head images the line-shaped read spot onto a detector array to recover multichannel recorded data. The data tracks 36a, 36b, and 36c are imaged onto a detector surface containing an array of photodetector elements, 38a through 38j. The region of the recording medium that is illuminated by the read spot is imaged over the detector array at region 24'. Although an extended length of each track may be imaged onto the detector, only the recorded marks immediately illuminated by the record beam reflect light to affect the response of the photodetector elements. As the recording medium moves, its image moves across the detector in a direction 35. However, the illuminated region of the detector remains fixed with the read beam. The detectors generate signals corresponding to the scanned reflectance of the data tracks.

The spacing of detector array elements, 38a through 38j, should be no greater than half of the track pitch as imaged at the detector. In the FIG. 5 there are approximately three detectors elements per track. A multiplexer 40 selects the detector element that is best centered on the image of each track and routes its signal to the corresponding channel electronics. For example, detector 38b is multiplexed to data channel 42c to read the data on track 36c, detector 38e is multiplexed to data channel 42b to read the data on track 36b, and detector 38h is multiplexed to data channel 42a to read the data on track 36a.

The readout system illustrated by FIG. 4 and FIG. 5 does not depend on precise alignment of the data tracks or readout beam. All that is required is that the focused readout line crosses all data tracks, the image of the focused readout line is narrower than the detector array, and the image of all data tracks targeted for readout cross the detector array. In this way, DRAW functionality can be accomplished without sub-micron alignment precision in the optical head, even for multichannel systems.

The invention has been described in detail with particular reference to certain preferred embodiments thereof, but it will be understood that variations and modifications can be effected within the spirit and scope of the invention.

PARTS LIST 10 optical head
12 record laser
14 objective lens
16 recording spot
16a recording spot
16b recording spot
16c recording spot
18 optical recording medium
20 read laser
22 beam splitter
24 read spot
24' read spot image
25 media scan direction
25a media scan direction
26 detector
28 beam splitter
30 actuator
32 mirror
34 actuator
35 image scan direction
36a track image
36b track image
36c track image
38a photodetector element
38b photodetector element
38c photodetector element
38d photodetector element
38e photodetector element
38f photodetector element
38g photodetector element
38h photodetector element
38i photodetector element
38j photodetector element
40 multiplexer
42a data channel
42b data channel
42c data channel

What is claimed is:

1. Apparatus for simultaneously recording and reading information on a medium moveable in forward and reverse directions, comprising:

a) means including a first record laser and establishing a first beam path for recording information on a track of the moveable medium;

b) means including a second read laser and at least one readout detector and establishing a second beam path over which light from the second laser illuminates the medium and is reflected to the detector which reads recorded information on the track; and c) means for adjusting the relative position of the first and second laser beam paths so that, in a first position, when the medium is moving in the forward direction, the first and second laser paths are arranged in close proximity so that the detector reads information which was just previously recorded by the record laser and that, in the second position, when the medium is moving in the reverse direction, the first and second laser paths are arranged in close proximity on the track so that the detector reads information which was just previously recorded by the record laser.

2. The apparatus of claim 1 wherein the means for adjusting the relative beam path position includes an adjustable path changing element disposed in the first beam path for changing the relative positions of the first and second beam paths.

3. The apparatus of claim 1 wherein the means for adjusting the relative beam path position includes an adjustable path changing element disposed in the second beam path for changing the relative positions of the first and second beam paths.

4. The apparatus of claim 1 further including a beam splitter arranged in the second beam path to intercept light from the read laser beam which is reflected from the recording medium and direct it to the detector.

5. The apparatus of claim 1 wherein the means for adjusting the relative beam path position includes a moveable reflecting surface or a moveable beam splitter.

6. The apparatus of claim 1 wherein the means for adjusting the relative beam path position includes an electro-optical beam deflector.

7. The apparatus of claim 1 further including circuit means coupled to the detector for processing detected information.

8. The apparatus of claim 1 wherein the second read laser produces a beam which, when it illuminates the moveable recording medium, is wider in the direction perpendicular to media motion than the beam produced by the first record laser when it illuminates the moveable recording medium.

9. The apparatus of claim 1 wherein the moveable medium is an optical tape.

* * * * *